Sept. 7, 1926.                    1,598,756
L. T. TROLAND
CINEMATOGRAPHY
Filed August 24, 1922    3 Sheets-Sheet 2
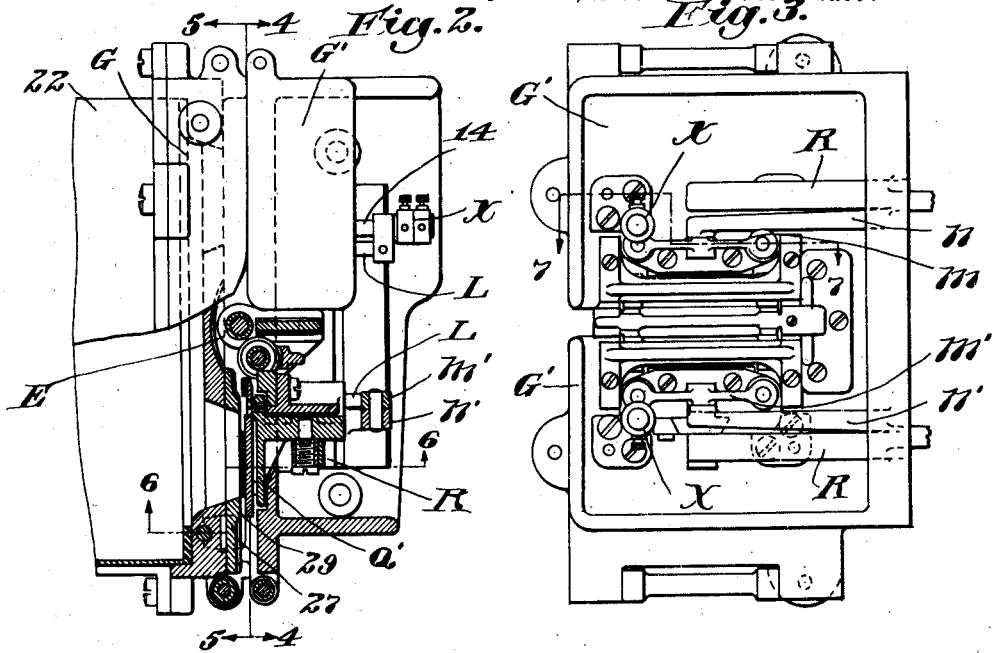
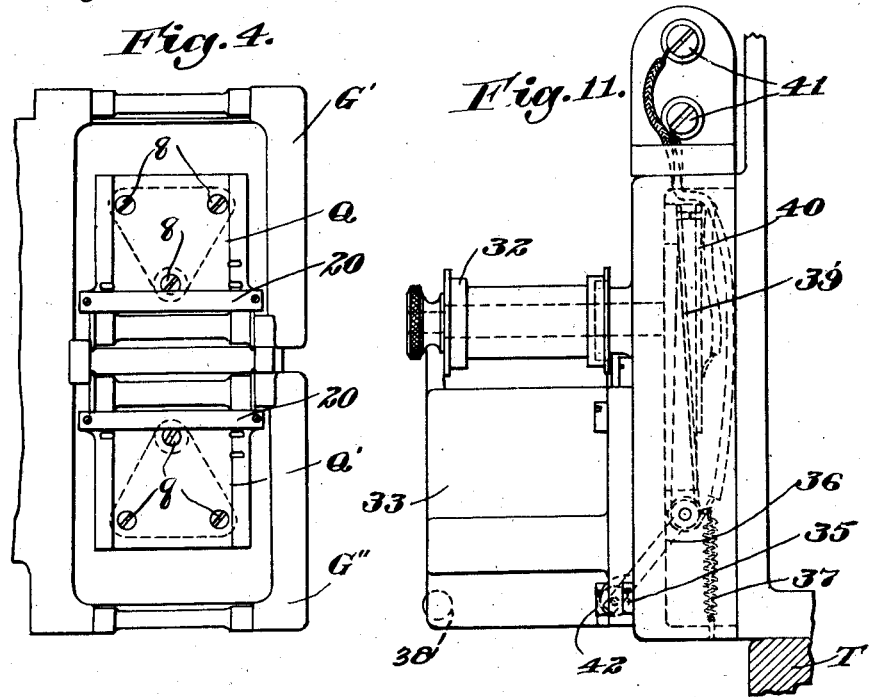
Inventor
Leonard T. Troland
by Roberts Roberts & Cushman
Attorneys Sept. 7, 1926.
L. T. TROLAND
1,598,756
CINEMATOGRAPHY
Filed August 24, 1922    3 Sheets-Sheet 3
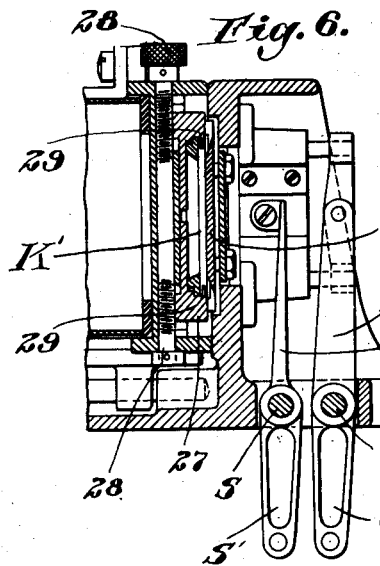
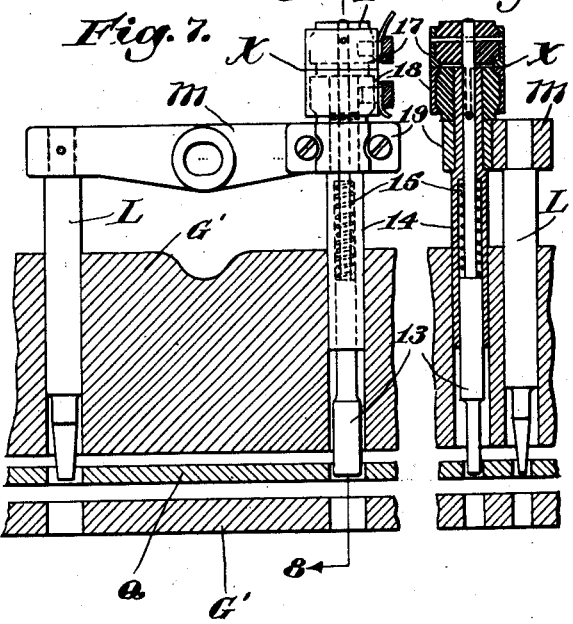
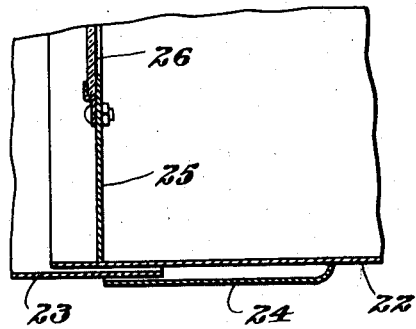
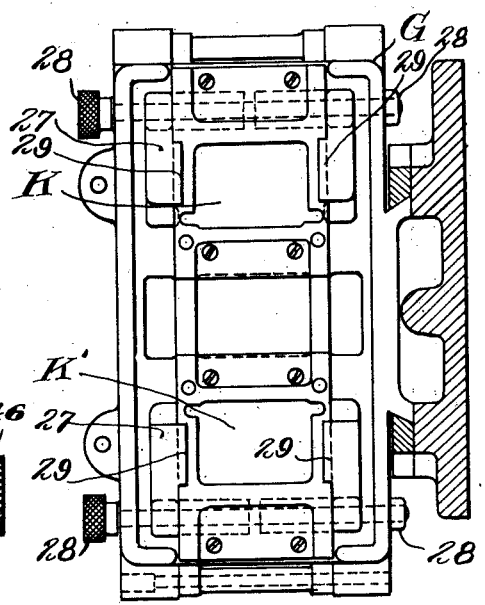
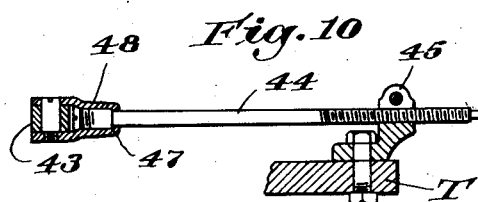
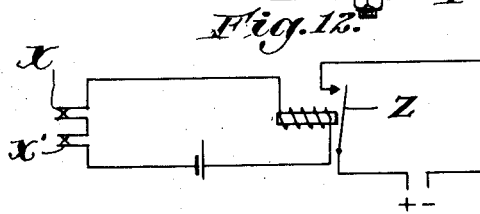
Inventor
Leonard T. Troland
by Roberts Roberts & Cushman
Attorneys Patented Sept. 7, 1926.

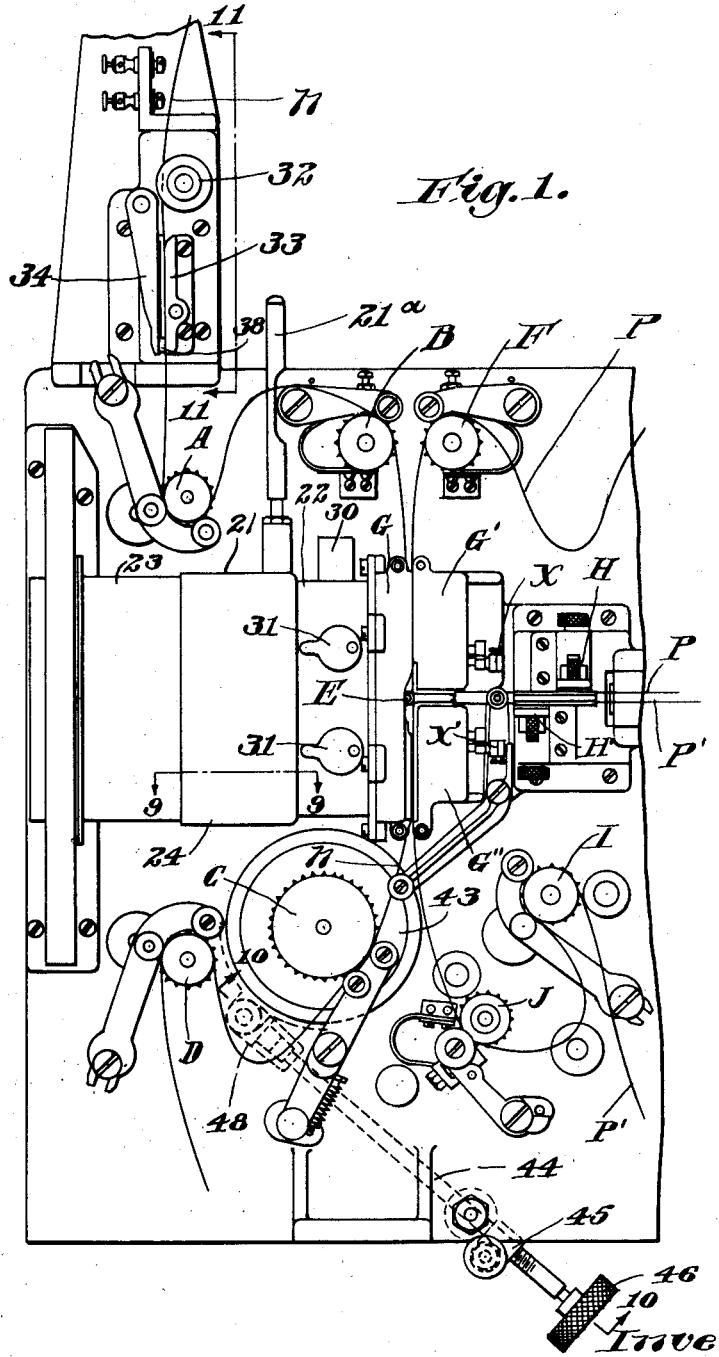

1,598,756

UNITED STATES PATENT OFFICE.

LEONARD T. TROLAND, OF MALDEN, MASSACHUSETTS, ASSIGNOR TO TECHNICOLOR MOTION PICTURE CORPORATION, OF BOSTON, MASSACHUSETTS, A CORPORATION OF MAINE.

CINEMATOGRAPHY.

Application filed August 24, 1922. Serial No. 583,995.

This invention relates to the production of cinematographic films, particularly complemental positive cinematographic films respectively bearing series of images representing different color aspects of an object field which when placed in superposed registry and suitably colored are adapted to reproduce the object field more or less accurately in natural colors. In general it is in the nature of improvements on the apparatus of the type disclosed in copending application Serial No. 512,399, filed Nov. 2, 1921, for simultaneously, or at least concomitantly, printing or otherwise forming complemental pictures or images upon a plurality of films from a single film having series of complemental pictures or images thereon. Various features of the apparatus herein disclosed, however, are not limited to any particular class of devices but are applicable to cinematographic apparatus in general.

In the production of films bearing complemental pictures an extremely high degree of accuracy in registration is essential by reason of the high magnification to which such pictures are subjected when projected on the screen. By reason of uneven shrinkage and other causes producing variation in films difficulty is experienced in so adjusting cinematographic apparatus that long strips of films may be fed therethrough in exact registration. This difficulty is increased several fold when a plurality of films are printed from a single negative for use in color cinematography. Moreover, unless the apparatus is promptly adjusted when any of the films fail to register, injury to the films frequently results through tearing the sprocket holes, thus rendering such films useless and in case of injury to the negative sometimes involving great expense and delay in retaking a scene.

Other difficulties experienced in producing complemental pictures which will register exactly include preventing the films from being displaced transversely of the plane thereof when the registering pins are advanced, the films frequently being punched and torn when out of registry more than a predetermined degree, and keeping the films from touching each other during their advance but sufficiently close for quick face engagement before the light apertures after registration.

Objects of the invention are to provide mechanism for automatically stopping cinematographic apparatus requiring accurate registration of films when the films are out of registry more than a predetermined degree, to restrain films from movement transversely of their planes as a result of the advancement of registering members, to produce smooth and quick face engagement of the films when registered but to prevent all contact thereof when in motion, to prevent the exposure control mechanism from interfering with the registration of the films, and in general to provide improved apparatus of the class described which will give uniformly satisfactory and efficient service.

In one aspect the invention comprises apparatus for advancing a film or a plurality of films through a guideway or gate, for registering the films in the guideway and with each other, and for stopping the apparatus when the films are out of registry more than a predetermined degree. The stopping means may take the form of a yieldingly mounted member adapted to be advanced through an opening in the guideway into the sprocket openings in the films, said member operating suitable control mechanism such as an electric switch when opposition is encountered due to failure of the films to register.

In another aspect the invention comprises means for preventing movement of a film transversely of its plane under force laterally applied such as in the transverse movement of registrating pins or under lateral pressure yieldingly or otherwise applied. Such means may comprise members engaging the films adjacent the application of force and either longitudinally or transversely disposed whereby the movement or force is resisted either marginally or entirely across the film.

In another aspect the invention comprises a method and apparatus for recurrently bringing a plurality of films disposed in parallel juxtaposition quickly and smoothly into and out of face contact. Yielding constant pressure is applied to one film tend- Other features of the invention will be apparent from the following detailed description of one embodiment of the invention shown for the purpose of illustration in the accompanying drawings, in which—

Fig. 1 is a side elevation of a portion of a cinematographic printer embodying the invention;

Fig. 2 is an enlarged elevational view of a film gate partly in section;

Fig. 3 is an end elevation viewed from the right-hand side of Fig. 2;

Fig. 4 is an elevational view on the line 4—4 of Fig. 2;

Fig. 5 is an elevational view on the line 5—5 of Fig. 2;

Fig. 6 is a sectional view on the line 6—6 of Fig. 2;

Fig. 7 is a sectional view on the line 7—7 of Fig. 3;

Fig. 8 is a sectional view on the line 8—8 of Fig. 7;

Fig. 9 is a sectional view on the line 9—9 of Fig. 1;

Fig. 10 is a sectional view on the line 10—10 of Fig. 1;

Fig. 11 is an elevational view on the line 11—11 of Fig. 1; and

Fig. 12 is a wiring diagram.

The embodiment of the invention shown for the purpose of illustration is adapted to print from a single negative film N upon the separate positive films P and P', the negative bearing two series of complemental images, one series being printed on positive film P and the other series being printed on positive film P'. The negative film N is fed from a suitable feed reel (not shown) downwardly over sprocket wheel A thence over tension sprocket B, thence through film gate G, thence over intermittent drive sprocket C, thence over constant drive sprocket D, and thence to a take-up reel (not shown). A guide roller E is mounted on an eccentric shaft substantially mid-way of gate G so that by rotating the shaft of this guide roller the path of the film thereabove and therebelow may be shortened or lengthened at will for the purpose of registering the images on the negative film with the light apertures of the gate. The positive film P is fed downwardly from a feed reel (not shown) over the tension sprocket wheel F, downwardly along the innerface of the upper portion G' of the film gate cover, and thence laterally under a punch H to suitable driving means and a take-up reel (not shown). The positive film P' is fed upwardly from the feed reel (not shown) over a sprocket I, thence over a tension sprocket J, thence along the rear face of the lower portion G" of the film gate cover, and thence laterally under a punch H' to suitable driving mechanism and to a take-up reel (not shown).

Negative film N and positive film P are brought into exact registration before light aperture K in film gate G by means of pilot pins L entering aligned sprocket holes in the two films. In the same manner negative film N and positive film P' are brought into exact registration before light aperture K' in film gate G by similar pilot pins L entering aligned sprocket holes in the two films. Both sets of pilot pins L are mounted upon parallel cross-bars M and M' adapted to be simultaneously advanced and retracted through pivotal connections with arms n and n' fast upon a rock shaft O actuated through bar O' by any suitable means such as a cam device (not shown). The positive films P and P' are arranged to be brought into contact with negative film N before apertures K and K' by pressure plates Q and Q' which are arranged to be simultaneously advanced by pivotal connections with arms R and R' fast on a rock shaft S actuated through an arm S' by any suitable mechanism such as a cam device (not shown). As shown in Figs. 2 and 4 each pressure plate is mounted with three screws q so that the plates may be adjusted to parallel the films.

The apparatus so far described conforms substantially to that shown and described in co-pending application above identified and is adapted to operate in the same manner. The films are intermittently advanced, the amount of advance of the negative film being twice that of either of the positive films. During the periods of rest the pins L first advance to enter the aligned sprocket holes in the spaced films and the pressure plates Q and Q' then advance to force the positive films into intimate contact with the negative films before the light apertures K and K' whereupon the printing operation takes place. The pressure plates Q and Q' then retract followed by the registering pins L, and then the films again advance.

To insure the accurate registration of the positive films with the negative film at all times and to prevent injury to the films due to the forcible entry of the registering pins L when the sprocket holes in the films are excessively out of registry with the openings for the pins in the film gate cover or with each other, suitable mechanism is provided for stopping the entire apparatus. Such stop mechanism, best disclosed in Figs. 7 and 8, comprises auxiliary pins or members 13 respectively adapted to enter the next sprocket hole in the rear of the sprocket holes entered by registering pins L. Members 13 are preferably untapered, and are somewhat smaller than the sprocket openings (for example, about one-hundredths inch in each dimension). Thus when the film is out of register more than a predetermined amount (for example, one-hundredth inch) the advance of the members is obstructed by the film and the driving mechanism is stopped as hereinafter described.

As shown in Figs. 7 and 8 each of the members 13 has a reduced shank sliding in a guide tube 14 the shank being further reduced for the purpose of accommodating a spring 15 which yieldingly resists rearward movement of the member. The end of the shank is provided with a head 16 having a collar of conducting material 17 adapted normally to make an electrical contact with a similar collar or annulus 18 on the outer end of guide member 14. Collars 17 and 18 are provided with suitable binding posts and constitute electrical switches X and X' (Figs. 1 and 12.) Guide member 14 is made fast to cross-bar M by any suitable device such as clamp 19 and moves therewith. The electric circuit including switches X and X' and the motor Y which drives the entire apparatus is diagrammatically illustrated in Fig. 12 wherein switches X and X' when in normal closed position actuate a relay Z to maintain the circuit closed through motor Y. As soon as either of the switches X or X' is opened due to failure of the films to register the relay Z automatically opens the circuit to motor Y and the apparatus is stopped until adjusted by the operator and again set in motion.
To prevent the positive films P and P' from being carried transversely of their planes by registering pins L as the latter advance, suitable means for restraining such movement are provided on both the pressure plates Q and Q'. These means may take the form of thin metal strips 20 disposed transversely of the path of the film immediately beyond the openings for the registering pins L. These strips are spaced from the pressure plates only sufficiently to provide clearance for the films and are attached to the pressure plates positively to withdraw the positive films from contact with the negative films when the pressure plates are retracted at the close of the printing operation. By the provision of these plates the entry of the registering pins into the sprocket openings of the films prevents the films from being moved transversely of their planes by the pins thereby to interfere with the registration thereof. This means is of particular importance when the positive film is relatively thin.

As disclosed in Figs. 1 and 6, film gate G is fast to a casing 21 extending from the lamp house at the left of Fig. 1. This casing comprises two telescoping parts 22 and 23 to the former of which the gate G is attached. Part 22 is provided with an offset parallel peripheral flange 24 (Fig. 9) forming a light-tight connection with part 23 and permitting limited telescoping movement of part 22 within part 23. The inner end of part 22 is closed by a partition 25 providing means for removably mounting suitable glass windows 26 in the light paths extending to light apertures K and K' in gate G, these windows serving to render the casing substantially air-tight and also to determine the light paths to the film gates. An actuator 21ᵃ is provided for controlling suitable latch mechanism (not shown) for retaining part 22 of the casing in adjusted position. As indicated in Fig. 6 the light apertures K and K' comprise openings in frames or windows 27 adjustably mounted transversely in the gate by adjusting screws whereby the plates may be adjusted until the light apertures therein register exactly with the film gate windows. By the provision of overhanging strips or flanges 29 adjacent the vertical sides of windows 27 a guide passage is provided for the negative film N, these overhanging flanges being arranged to engage the marginal edges of the film to prevent movement thereof transversely of the plane of the film. These flanges in combination with strips 20 on the film gate positively hold the films out of contact during the intermittent advancement thereof and restrain the negative from curling.

When the apparatus is in operation air under pressure is supplied to the chamber formed within part 22 of the casing by partition 25, the air entering the casing by a suitable connection to an inlet 30 (Fig. 1). The air pressure is carefully gauged and is merely sufficient to slightly bulge the centre of the film outwardly and hold the marginal portions thereof against the overhanging guide flanges 29 so that inward bulging of the negative film within the light apertures K and K' due to wrinkles in the film caused by passing of the latter over the sprockets or in any other manner is prevented. When the positive films P and P' are advanced by their respective pressure plates Q and Q' to contact with the negative film they first contact the bulged centre thereof, and then contact the rest of the film in a smooth and even manner without relative movement thereof, pressure plates Q and Q' having their edges beveled as indicated in Fig. 6 to cooperate with the bevel on the guide flanges 29 so that the central portions of the plates bring the positive films into intimate contact with the negative film throughout the picture space, thus insuring an accurate contact print without distortion. If desired the part 22 of the casing may be provided with pivoted plates 31 covering windows through which the operator may view the interior of the casing.

Means for controlling the exposure of the positive film, either by increasing or decreasing the resistance in the light circuits, or by controlling the speed of the machine, are provided in a position where such means will not interfere with the accurate registration of the films between the film gates. Such mechanism is arranged to engage the negative film N before it reaches sprocket A, and is shown in end elevation in Fig. 1 and in side elevation in Fig. 11. This mechanism as shown includes a guide sprocket 32, a guide plate 33 against which a pivoted retainer 34 is adjustably held to vary the tension on the negative film as it passes therethrough. Engaging one edge of the negative film is a small roller 35 mounted upon an arm 36, a spring 37 holding the roller 35 in contact with the edge of the film. A similar roller 38 on the opposite edge holds the film against lateral movement. Fast on arm 36 is a contact arm 39 normally held out of contact with a fixed contact arm 40, the electrical connections to the two arms being supplied from binding posts 41 on the device. The negative film is provided with marginal notches 42 spaced at the proper intervals into which the roller 35 is adapted to be forced by spring 37 thus moving arm 39 into contact with arm 40 and closing the circuit therethrough for automatically operating any desired control mechanism for the exposure of the films. All interference of the above described control device with the registration of the films within the film-gates is avoided by the interposition of driving sprocket A, tension sprocket B and the intervening loop in the negative film.

When the films fail to register with each other or with the aligned openings in the film-gate adjustment of the films by the operator is necessary. Such adjustment may be made either through the eccentrically mounted roller E or through shifting the mounting for the intermittent feed roller C in the case of the negative film or by shifting the mounting of the intermittent feed devices (not shown) for the positive films. Roller E by reason of its eccentric mounting adjusts the negative film relative to the light apertures K and K' by lengthening or shortening the path of the film through gate G, while shifting the mounting of the intermittent feed roller C adjusts the negative film relative to both of the light apertures equally. Mechanism for making a very accurate adjustment of the intermittent feed mechanism when running is disclosed in Figs. 1 and 10. As indicated in Fig. 1 the sprocket C and the mechanism therefor (not shown) is mounted upon a rotatable plate 43 adapted to be oscillated through a limited arc by means of a threaded shaft 44 passing through a threaded opening in a bracket 45 attached to the back plate T of the apparatus (Fig. 10). Shaft 44 has an operating handle 46 at one end and is rotatably connected at 47 to a yoke or socket member 48 pivotally connected to an extension on plate 43.

From the above it will be apparent that the apparatus herein disclosed is adapted by means of the automatic stop mechanism to prevent injury to the films by entirely stopping the device when the films fail to register, that interference with the accurate registration of the films through transverse movement thereof caused by frictional engagement of the registering pins therewith is prevented by the cross strips which maintain the positive films against the movable pressure plates, that the application of yielding pressure to the negative film causing the latter to bow toward the positive films insures an even and smooth engagement of the films when they are moved into contact for the printing operation, and that control mechanism for automatically changing the exposure of the positive films is disposed in a position where it cannot interfere with the registering operation.

I claim:—

1. Cinematographic apparatus comprising means for intermittently advancing two films in spaced parallel juxtaposed relation, means entering aligned openings in said films to register the same, and means including an element adapted to cooperate directly with said films for stopping the apparatus when the films are out of registry more than a predetermined degree.

2. Cinematographic apparatus comprising means for intermittently advancing two films in spaced parallel juxtaposed relation, pilot pins entering aligned openings in said films to register the same, and means including a film engaging element movable in a path parallel to that of said pins for stopping the apparatus when the films are out of registry more than a predetermined degree.

3. Cinematographic apparatus comprising means for intermittently advancing two films in spaced parallel juxtaposed relation, means entering aligned openings in said films to register the same, and a movable member adapted to cooperate with said films and to be actuated when the films are out of registry more than a predetermined degree to stop the operation of the apparatus.

4. Cinematographic apparatus comprising means for intermittently advancing two films in spaced parallel juxtaposed relation, pilot pins entering aligned openings in said films to register the same, and a member adapted to enter aligned sprocket openings in said films other than those entered by the pilot pins and to stop the operation of the apparatus when the films are out of registry more than a predetermined degree.

5. Cinematographic apparatus comprising means for intermittently advancing two films in spaced parallel juxtaposed relation, pilot pins entering aligned openings in said films to register the same, and electrical control means for said apparatus including an automatic switch adapted to be opened when the films are out of mutual registry more than a predetermined degree.

6. Cinematographic apparatus comprising means for intermittently advancing two films in spaced parallel juxtaposed relation, pilot pins entering aligned openings in said films to register the same, and electrical control means for said devices including a switch having a spring pressed member adapted to enter other aligned openings in said films when the films register approximately and to be moved to open the switch when the films are out of registry more than a predetermined degree.

7. Cinematographic apparatus comprising a film gate having an opening therein, means for advancing a film through said gate past said opening, means recurrently advancing a pin through said opening and into a sprocket opening in the film, control means for the apparatus including an electrical switch arranged to open when the pin is obstructed by the film through failure of the film to register with said opening.

8. Cinematographic apparatus comprising a film gate having an opening therein, means for advancing a film through said gate past said opening, means recurrently advancing a yieldingly mounted pin through said opening into a sprocket opening in the film, and a control switch associated with said pin to open when said pin is forced back through failure of the openings in the film to register.

9. Cinematographic apparatus comprising a film gate, means for intermittently advancing film through the gate with succeeding sections in registry with the gate during the periods of rest, a device periodically entering registry openings in the film during said periods, said device being yieldingly mounted so as to be held back by the film when out of registry more than a predetermined degree, and means controlled by said device for stopping said advancing means when the device is held back by the film.

10. Cinematographic apparatus comprising a film gate having an image window therein, means for advancing two films in spaced parallel relationship past said window, a spring pressed pin arranged to enter recurrent openings in the film when the films register with said opening and to be held back by engagement with one film when the films are out of registry more than a predetermined degree, and means extending between the films adjacent said opening to counteract the thrust of said pin.

11. Cinematographic apparatus comprising means for advancing two films in spaced parallel relationship, a pin arranged to enter aligned sprocket openings in both said films to register the same, and means to restrain the first film from being moved into contact with the second by said pin.

12. Cinematographic apparatus comprising means for advancing two films in spaced parallel juxtaposed relationship, pins arranged to enter aligned sprocket openings in both said films to register the same, means to restrain the first film from being moved into contact with the second by said pins, and means for moving one film transversely into contact with the other film after the films are registered.

13. Cinematographic apparatus comprising means for advancing two films in spaced parallel juxtaposed relationship, pins arranged to enter aligned sprocket openings in both said films to register the same, means to restrain the first film from being moved into contact with the second by said pins, and means for moving one film transversely into contact with the other film after the films are registered, said restraining means being mounted on said last means.

14. Cinematographic apparatus comprising means for advancing two films in spaced parallel relationship, members transversely advanced to enter aligned sprocket openings in both said films to register the same, means to restrain the first film from being moved into contact with the second by said members, and a member for moving the first film transversely into contact with the second after the films are registered, said restraining means being mounted on said last moved member and said registering members passing through openings therein.

15. Cinematographic apparatus comprising means for intermittently advancing two films in spaced parallel relationship, pilot pins recurrently advanced through aligned openings in both films to register the same, and a cross-piece restraining the first film from being moved toward the second by said pilot pins.

16. Cinematographic apparatus comprising means for intermittently advancing two films in spaced parallel relationship, pilot pins recurrently advanced through aligned openings in both films to register the same, a cross-piece restraining the first film from being moved toward the second by said pilot pins, a pressure plate adapted to be recurrently advanced after the films are registered to move the first film into contact with the second, said cross-piece being mounted upon said plate.

17. Cinematographic apparatus comprising means for intermittently moving two films in parallel relationship, means for positively holding the films in spaced position during said movement, and means for producing air pressure to bring the films into contact during periods of rest between intermittent movements.

18. Cinematographic apparatus comprising means for intermittently moving two juxtaposed films, means constantly urging one film toward the other, means positively holding the films in spaced relation between the periods of intermittent movement, and means operative during the periods of rest positively to cause movement of recurrent portions of one film into contact with recurrent portions of the other film.

19. Cinematographic apparatus having a film gate and provided with means intermittently moving two juxtaposed films through said gate, said gate having a light aperture, means positively holding said films in spaced juxtaposed relation during the periods of intermittent movement, and means for bringing said films into mutual contact before said aperture during periods of rest, including yielding means urging one film toward the other and positive means urging the last named film toward the first.

20. Cinematographic apparatus including a film gate and provided with means intermittently moving two films through said gate, said gate having a light aperture, means for holding said films in spaced juxtaposed position during said movement, and means for bringing portions of said films into contact before said aperture during periods of rest by means of fluid under pressure urging a portion of one film toward the other and positive means urging a portion of the latter toward the first.

21. In a printing machine, a light casing, a film-gate forming one end of said casing and having a light aperture, means advancing a negative film and a positive film through said gate before said aperture, means for delivering air under pressure to said casing yieldingly to urge one of said films toward the other, and guide members adjacent said aperture engaging the marginal portions of the nearest film to restrain its outward movement under the pressure in the casing.

22. In a printing machine, a film gate, means for advancing two films in spaced juxtaposition through said gate, a light aperture in said gate, and means for bringing said films into contact before said aperture comprising yielding means urging one film toward the other and positive means urging the other toward the first, means for registering said films by means of the sprocket openings therein prior to the contacting of the films, and means for stopping the advance of the films when the films are out of registry more than a predetermined degree.

23. The method of making complemental cinematographic films which comprises intermittently advancing two positive films toward each other in the same plane, advancing in a plane parallel to said plane and in timed relation thereto a negative film having series of complemental images thereon, maintaining yielding pressure on the negative film, moving the positive films during the periods of rest into contact with the negative film, and simultaneously printing complemental series of pictures on said positive films.

24. The method of making complemental cinematographic films which comprises advancing two positive films toward each other in the same plane, advancing a negative film in a plane parallel to the plane of the positive films and slightly spaced therefrom, and urging portions of the negative and positive films respectively laterally into contact, the negative film yieldingly and the positive films positively, and concomitantly printing a picture on each of said positive films while the latter are in contact with the negative film.

25. The method of making cinematographic films which comprises intermittently advancing a negative film and two positive films in parallel planes, moving the films laterally into contact during the periods of rest, the negative film yieldingly, and the positive films positively, and simultaneously printing a picture on each of the positive films while the latter are in contact with the negative film.

Signed by me at Boston, Massachusetts this nineteenth day of August 1922.

LEONARD T. TROLAND.